United States Patent [19]

Champoux

[11] Patent Number: 4,557,033

[45] Date of Patent: Dec. 10, 1985

[54] METHOD OF COLD EXPANDING AND SIZING FASTENER HOLES

[75] Inventor: Robert L. Champoux, Bellevue, Wash.

[73] Assignee: Fatigue Technology, Inc., Seattle, Wash.

[21] Appl. No.: 512,131

[22] Filed: Jul. 11, 1983

[51] Int. Cl.⁴ .................. B23P 19/02; B21B 17/02
[52] U.S. Cl. .................. 29/525; 29/526 R; 72/370; 72/391; 72/393
[58] Field of Search ............. 29/525, 523, 526 R; 72/370, 393, 391

[56] References Cited

U.S. PATENT DOCUMENTS

| | | | |
|---|---|---|---|
| 1,647,447 | 11/1927 | Hartnett . | |
| 1,648,189 | 11/1927 | Ottinger . | |
| 2,459,808 | 1/1949 | Geyer . | |
| 3,056,197 | 10/1962 | Lawson | 29/552 |
| 3,157,305 | 11/1964 | Baugh . | |
| 3,270,410 | 9/1966 | Salter et al. | 29/446 |
| 3,566,662 | 3/1971 | Champoux | 72/370 |
| 3,596,491 | 8/1971 | Cress | 72/283 |
| 3,665,744 | 5/1972 | Harter | 72/129 |
| 3,683,658 | 8/1972 | Roeschlaub | 72/119 |
| 3,693,247 | 9/1972 | Brown | 29/512 |
| 3,805,578 | 4/1974 | King, Jr. | 72/370 |
| 3,835,688 | 9/1974 | King, Jr. | 72/370 |
| 3,879,980 | 4/1975 | King, Jr. | 72/393 |
| 3,892,121 | 7/1975 | Champoux et al. | 72/393 |
| 3,943,748 | 3/1976 | King, Jr. | 72/393 |
| 3,949,535 | 4/1976 | King, Jr. | 52/758 |
| 4,127,345 | 11/1978 | Angelosanto et al. | 403/388 |
| 4,164,807 | 8/1979 | King, Jr. | 29/523 |
| 4,187,708 | 2/1980 | Champoux | 72/30 |
| 4,308,736 | 1/1982 | Lowe et al. | 72/36 |
| 4,471,643 | 9/1984 | Champoux et al. | 72/370 X |

OTHER PUBLICATIONS

Fatigue Improvement by Sleeve Coldworking by Joseph L. Phillips, pp. 1–12.

Primary Examiner—Charlie T. Moon
Attorney, Agent, or Firm—Eugene O. Heberer; Delbert J. Barnard

[57] ABSTRACT

The method of fastening a plurality of metal members (82, 84; 232, 230) in which precision holes (86, 88; 236, 234) are drilled through the metals which are to be connected together. The drilled holes in the metal members are cold-expanded to improve the fatigue performance of the metal surrounding the hole and at the same time size the hole. Then a fastener (254) sized to make a desired fit is installed into the hole. The final hole diameters (236A, 234A) after expansion are equal to the starting hole diameters plus the retained expansions, there being spring back shrinkage of the expanded holes to the final hole diameter. The holes are sized by expanding them to at least a critical sizing expansion value which is a value of expansion beyond which the retained expansion value is linearly exceeded and to nearly the same amount as the total expansion before elongation of the hole axis of the metal surrounding the hole. This is a method of cold-expanding a series of holes to size in which the same tools are used, with the result that the holes are varied in the diameter no more than 0.001".

31 Claims, 16 Drawing Figures

METHOD OF COLD EXPANDING AND SIZING FASTENER HOLES

DESCRIPTION

TECHNICAL FIELD

This invention relates to a method for simultaneously improving the fatigue performance of the metal surrounding a fastener hole and sizing the hole.

BACKGROUND ART

In the prior art a mandrelizing process was used for cold expanding fastener holes. It was cumbersome due to its two-sided operation, requirements for mandrel and hole lubrication, and excessive mandrel breakage. Although recent lubrication improvements have reduced galling and seizing problems, and a one sided mandrel has been developed, the mandrelizing process remains relatively costly due to the labor intensive operation and the need for mandrel and hole lubrication.

The development of a prelubricated split sleeve, used on the mandrel, permitted the development of one-sided operation in which the mandrel was extended through the drilled hole. A split sleeve was carried on a small diameter portion of the mandrel and was moved into the hole and the mandrel was pulled through the hole to cold-work the metal surrounding the hole with the split sleeve in place.

The process as developed included separate post reaming and countersinking operations. Post reaming was required to accommodate the wide variance in fastener interferences. While not based on fatigue test results, there was also a perceived requirement to remove a ridge left by the split in the sleeve. Fatigue test results dictated the need for separate countersink operation after cold-working of a straight hole. The increased usage of the split sleeve process has highlighted the desirability of eliminating these separate operations.

The basic patent relating to cold-expansion of fastener holes, by use of a split lubricated spacing sleeve, is U.S. Pat. No. 3,566,662, granted Mar. 2, 1971, to Louis A. Champoux, and entitled Coldworking Method And Apparatus. A Method And Apparatus For Making Sleeves is disclosed in U.S. Pat. No. 3,665,744, granted May 30, 1972, to Clair M. Harter. It should be noted that there are also cold-working sleeves in use that are not split. U.S. Pat. No. 3,892,121, granted July 1, 1975, to Louis A. Champoux, Horace E. Hill and Joseph L. Phillips, and entitled Apparatus For Cold-Working Holes, discloses a form of mandrel and mandrel pulling tool and gun. U.S. Pat. No. 4,187,708, granted Feb. 12, 1980, to Louis A. Champoux entitled Pulling Apparatus And Method, discloses a preferred form of pull gun.

A paper, entitled "Fatigue Improvement by Sleeve Coldworking by Joseph L. Phillips is also of interest.

U.S. Pat. Nos. 3,949,535 and 4,164,807 to John O. King, Jr. indicate, in column 2, lines 29-44 in the first patent and lines 32-46 in the second patent, that two problems are encountered using a split sleeve. The first is that the interruption of the tubular member surface at the split produces a reduced compressive stress gradient along the material at the surface of the hole and the second is that because the tubular member is allowed to move slightly axially within the hole during the cold-working operation, the axially oriented tensile stress gradient is still induced into the surface grain of the material about the hole. Thus, the desirable compressive stress gradient induced into the material at the surface of the hole is partially offset by the lower compressive stress gradient occurring at the split in the sleeve and secondly by the axially oriented tensile stress gradient induced in the grain of the material at the surface of the hole.

Further, in column 11, lines 57-65 in the first patent and lines 55-64 in the second patent, it is stated that in the prior art technique of expanding holes through the workpiece using a split tubular member, it will be seen from FIG. 23 that a discontinuity in the uniform stress gradient pattern is induced in the workpieces about the hole in the area of the split. It will also be noted that as the hole is expanded further, the discontinuity in the stress gradient of the prior art split tubular member cold-working technique induces an even wider discontinuity in the stress gradient.

The King, Jr. Pat. Nos. 3,949,535 and 4,164,807 have additional information, more pertinent and contrary to the teachings of the present invention. In column 2, in both of the patents, starting at line 63 in the first patent and line 65 in the second patent, it is stated that a hole sizing technique that has been attempted is to drill a pilot hole and then pull a mandrel with an expansion section thereon through the pilot to finally size the same. Because the material of the workpieces rebounds after the passage of the mandrel through the holes and the amount of rebound is a function of the amount the pilot hole is enlarged, it is necessary to accurately size the holes either before or after the enlarging operation with a tool such as a reamer in order to accurately determine the final hole size. Thus, because of the inability to accurately control the reaming operation when using manually held tools, this technique has been unable to accurately size holes.

The statements in the King, Jr. patents have been proven incorrect in prior split sleeve operations and in the development and testing relating to the present invention.

Other more recent pertinent inventions are described in U.S. Patent Applications: Apparatus And Method For Prestressing A Countersunk Fastener Hole, Ser. No. 273,725, by Louis A. Champoux, filed June 15, 1981, now Pat. No. 4,423,619; Method And Apparatus For Prestressing Fastener Holes, Ser. No. 347,717, by Robert L. Champoux et al, filed Feb. 10, 1982, now Pat. No. 4,471,643; and Apparatus Having Extended Prestressing And Sleeve Retaining Devices For Prestressing Countersunk Fastener Holes And Method, Ser. No. 347,739, by Louis A. Champoux, filed Feb. 10, 1982, now Pat. No. 4,425,780.

Other known prior art is as follows:

U.S. Pat. No. 1,647,447, granted Nov. 1, 1927, to G. J. Hartnett;

U.S. Pat. No. 1,648,189, granted Nov. 8, 1927, to L. Ottinger;

U.S. Pat. No. 2,459,808, granted Jan. 25, 1949, to G. A. Geyer;

U.S. Pat. No. 3,056,197, granted Oct. 2, 1962, to R. G. Lawson;

U.S. Pat. No. 3,157,305, granted Nov. 17, 1964, to C. W. Baugh;

U.S. Pat. No. 3,270,410, granted Sept. 6, 1966, to L. Salter et al;

U.S. Pat. No. 3,596,491, granted Aug. 3, 1971, to H. A. Cress;

U.S. Pat. No. 3,683,658, granted Aug. 15, 1972, to R. C. Roeschlaub;

U.S. Pat. No. 3,693,247, granted Sept. 26, 1972, to C. K. Brown;

U.S. Pat. No. 3,805,578, granted Apr. 23, 1974, to J. O. King, Jr.;

U.S. Pat. No. 3,835,688, granted Sept. 17, 1974, to J. O. King, Jr.;

U.S. Pat. No. 3,879,980, granted Apr. 29, 1975, to J. O. King, Jr.;

U.S. Pat. No. 3,943,748, granted Mar. 16, 1976, to J. O. King, Jr.;

U.S. Pat. No. 3,949,535, granted Apr. 13, 1976, to J. O. King, Jr.;

U.S. Pat. No. 4,127,345, granted Nov. 28, 1978, to D. J. Angelosanto et al;

U.S. Pat. No. 4,164,807, granted Aug. 21, 1979, to J. O. King, Jr.; and

U.S. Pat. No. 4,308,736, granted Jan. 5, 1982, to J. R. Lowe at al.

DISCLOSURE OF THE INVENTION

It has been surprisingly found that holes may be precisely and predictably sized using the cold-expansion process. That is, according to the invention, the hole is precisely drilled in one step and then cold-expanded and sized in a second step.

Further, it has been discovered that the ridge formed by the split in the sleeve may be left in the hole without adversely affecting the fatigue life of a cold-worked hole. According to the invention, the ridge is plastically removed when an interference fit fastener is installed. In the prior art the precision sizing of holes and removing of the ridge was accomplished by reaming and/or broaching.

In addition, according to the invention, it has been discovered that, for nominal fastener sizes, the cold-work sizing of a hole can be controlled so as to allow fastener threads, or other end designs, to be used as a gauge, eliminating the need to verify that a hole has been cold-expanded. Thus, if the threaded or annularly grooved end of a fastener does not fit into a hole, that is proof that the cold-expanding process has not been applied to the hole. In the prior art a plug gauge was used to verify that a hole has been cold-expanded. Considering the many thousands of holes drilled and cold-expanded in an aircraft, for example, the capability of being able, as the result of the invention, to test each hole for cold-expansion by insertion of a fastener threaded end is of great importance.

The invention includes the method of fastening metal members together, through a precision hole drilled through the metals which are to be connected together. The drilled hole in the metals is then cold-expanded to improve the fatigue performance of the metal surrounding the hole and to size the hole. A predetermined fastener is then fitted into the hole. The method further includes cold-expanding by placing a split sleeve in the hole and pulling a mandrel through the split sleeve.

When a mandrelizing sleeveless mandrel is used with a proper lubricant on the mandrel, a straight hole may be cold-expanded without a sleeve in accordance with the above method.

The method further includes drilling a countersink into the outer surface of one of the members and cold-expanding the metal surrounding the countersink in the same operation that the hole is cold-expanded.

The invention employs unique starting hole, mandrel and sleeve dimensions which, after split sleeve cold-expansion, result in a close tolerance finished hole diameter. The starting hole and mandrel diameters, in conjunction with the sleeve wall thickness, are selected to achieve a three to six percent nominal applied expansion, a percentage measurement as distinct from absolute applied expansion which is a measurement in inches. Applied expansions in the range of 3% to 6% in metal such as aluminum, steel, and titanium consistently shrink or spring back to the same expanded hole diameter.

The diameter of a hole after cold-expansion is dependent upon the amount of applied expansion and spring back characteristics of the material. For example, in the case of aluminum alloys, the cold-expanded hole diameters are very consistent (0.0004" variation) for each particular plate of material. This phenomena occurs despite variations in applied expansions of up to 0.004" due to starting hole, mandrel, and sleeve dimensional tolerances. When these tolerances are limited to 0.004", the final hole diameter variation in a series of holes does not vary more than 0.001". The variation of 0.004" depends upon the starting hole tolerance of about 0.003", and a mandrel and sleeve tolerance of up to 0.001", the sleeve thicknesses being normally of an exact amount. The stated tolerances and the discovery that the final hole diameters will vary no more than 0.001" are primary discoveries of the invention.

After cold-expansion and spring back, the hole then has retained expansion which is the difference in dimension between the final hole size and the drill hole size.

Expansion, as used here, is the increase in diameter of the drilled hole by an amount sufficient to cause the metal surrounding the hole to exceed the yield point of the metal. The yield point for aluminum alloys, for example, is about 0.5%. Low expansion means expansion above the yield point but below high expansion, the latter being the amount of expansion sufficient to produce optimum fatigue life improvement which is a requirement of cold-working expansion according to the invention.

The critical sizing expansion value is a value of expansion beyond which the retained expansion value is linearly exceeded and to nearly but less than the same amount as the total expansion before elongation of the hole axis of the metal surrounding the hole; that is, the limit before surface upset. The critical sizing expansion value can also be defined as that value of absolute expansion beyond which the final sizing of the hole is nearly solely determined by (1) the mandrel diameter and sleeve thickness or (2) the sum of the starting hole diameter plus the absolute applied expansion. The critical sizing expansion value is the amount of expansion in terms of absolute applied expansion in inches or applied expansion as a percentage which the hole must be expanded to accomplish the results of the invention.

In considering a series of drilled holes, the gross amount of cold-expansion that the series are expanded in size is an applied expansion value which is a function of the drilled hole diameter, the mandrel diameter and the sleeve thickness. The actual amount of applied expansion may vary from the designed applied expansion for each hole by an amount as great as 0.004" for a series of drilled holes to achieve a total final diameter variation amongst the holes of no more than 0.001".

After a starting hole is drilled to within a 0.003" diameter tolerance, a subsequent one step operation simultaneously cold-works and sizes the hole, including a countersink, such that a final inspection of the hole diameter is not required. The threads of nominal fasteners determine that the cold-expansion has been accomplished by the fact that the threads enter the hole. The present invention provides a costs savings of between 38% and 43% on the prior art cold-expansion methods, the range depending upon the countersinking method and timing.

Further advantages of the invention may be brought in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

BEST MODE FOR CARRYING OUT THE INVENTION

Referring again to the drawings, devices for cold-working a fastener hole are shown in detail. A pull gun, not shown, is operated hydraulically to move a mandrel 12 from an extended, FIG. 2, to a retracted position, FIG. 4. The pull gun may be of the type disclosed in U.S. Pat. No. 4,187,708, granted Feb. 12, 1980. The hydraulic operating means in disclosed in the patent in detail.

Figure 1:
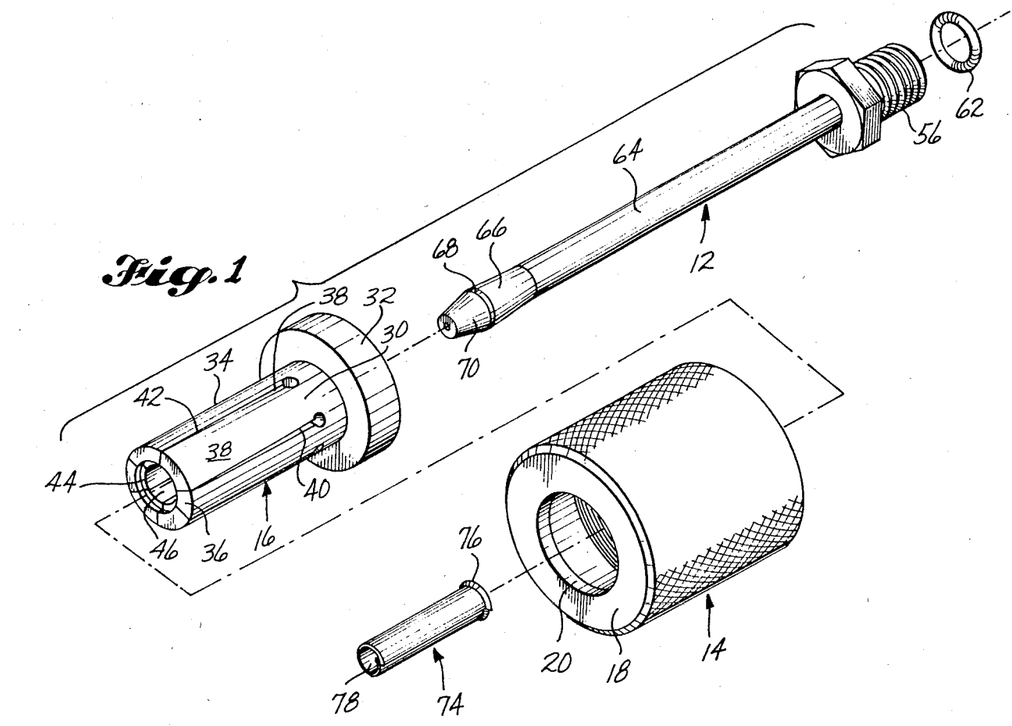
FIG. 1 is an exploded view of a straight-hole mandrel, and extension of a pull gun, an outer cap of the pull gun which secures the extension in the gun, and of an internally lubricated, axially split sleeve having a flared end, the flared end being adapted to fit into a recess at the outer end of a sleeve holder/extension of the pull gun when the mandrel and sleeve are being retracted from a workpiece.
Figure 2:
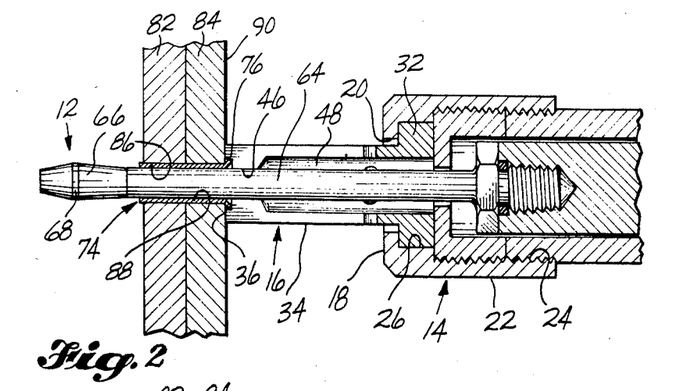
FIG. 2 is the first of three longitudinal sectional views illustrating the sequence of a cold-working operation, the first view showing the capped nose portion of a pull gun, a portion of a workpiece immediately surrounding the fastener hole to be cold-worked, a cold-working sleeve in section, a mandrel in side elevation, and a sleeve retainer secured in the cap of the gun and in abutment with the workpiece and surrounding a cylindrical portion of the mandrel, the first view showing the position of the cold-working tools immediately following the insertion of the mandrel and sleeve into the fastener hole with the flared end of the sleeve in a recess in the end of the retainer.
Figure 3:
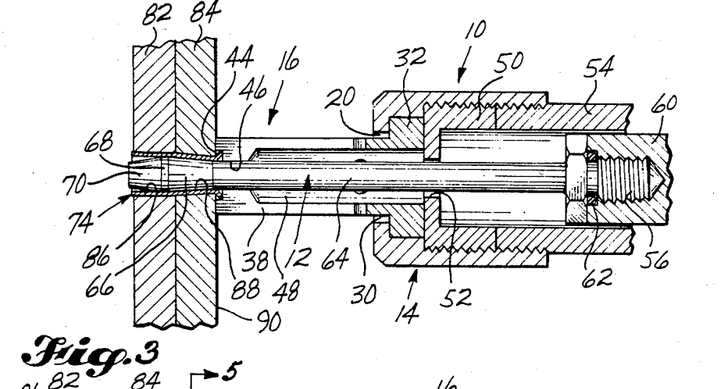
FIG. 3 is a view similar to FIG. 2, illustrating a retraction of the mandrel by the pull gun, the increasing diameter portion and maximum diameter portion of the mandrel in a cold-working action of the metal surrounding the fastener hole.

A generally cylindrical nose cap 14, FIGS. 1-3, is provided adjacent the working end of the pull gun and is adapted to secure a small diameter nose piece, in the form of a generally cylindrical elongated sleeve retainer or extension 16 within the outer end of the gun. The cap 14 has an outer radial end wall 18 formed to include a cylindrical center opening 20. Inwardly of the wall 18 is a cylindrical wall 22 having internal threads 24, terminating forwardly in at small diameter portion 26 forming an inwardly extension of the opening 20. Rearwardly of and radially outwardly of the opening 20 is a flange formed by the wall 18 which is adapted to retain a radially extending circumferentially continuous, cylindrical flange base 32 of the sleeve retainer 16.

As best seen in FIGS. 1 and 2, the flange 32 forms the inner end of the retainer along with an outer continuous, generally cylindrical portion 30. A tapering tubular portion 34 of the nose piece terminates in an outer flat radially directed end 36. The tapering portion 34 is formed of six axially directed spring fingers 38, spaced at their inner ends by adjacent slits or slots 40; the slots narrow outwardly to slits 42 in which axial surface of theslots normally make contact with each other.

At the outer end, radially inwardly of the wall 36 is an annular recess 44 formed along the outer surfaces of the six fingers 38. Extending inwardly of the recess is small diameter central generally cylindrical passage 46 and inwardly thereof is an enlarged diameter passage 48, FIGS. 2 and 3.

The retainer 16 is made from ultra high strength alloy steel, and in the unhardened state the slots 40 are cut therein so as to have generally axially directed parallel sides, not shown. In preparation for heat treating, an annular clamping device, such as a ring, is positioned around the outer circumference of the extension adjacent the outer end so as to cause the slots adjacent the outer end to be narrowed into slits. The retainer is then heat treated and quenched and when the clamping means is removed, the retainer remains in the form as clamped, and as shown. The fingers 38 are in the form of hardened springs, biased radially inwardly, and adapted to fit tightly on all portions of the mandrel that pass through the small diameter portion 46, FIGS. 2 and 3.

The retainer 16 is secured within the gun by a retainer nut 50, FIG. 3, having a central passage 52 for the mandrel 12. Inwardly of the nut is an annular wall 54 on which the cap 14 is threadly engaged.

Inner end 56 of the mandrel is threadedly engaged with an adapter 60, FIG. 3, secured to a pneumatic piston in the gun, not shown. The end 56 is hand tightened into the adapter and is locked in place by an O-ring 62. Extending outwardly of its inner end, the mandrel has a small diameter cylindrical portion 64 on which the fingers 38 of the sleeve retainer are normally tightly but slidably engaged, FIGS. 2 and 3. Outwardly of the portion 64 is an increasing diameter conical portion 66, terminating in a maximum diameter cylindrical portion 68. Tapering outwardly from the maximum diameter cylindrical portion is a decreasing diameter frusto-conical end portion 70.

When the mandrel 12 is extended, FIG. 2, a thin axially split, cold-expansion steel sleeve 74 is slipped over the outer end of the mandrel onto the small diameter portion 64. The sleeve has an inner flared end 76. The cold-expansion sleeve has a comparable or higher modulus and yield than the material of the workpiece. Interior surface 78 of the sleeve has a solid film lubricant of a commercial type which includes lead oxide, graphite and molybdenum disulfide. The lubricant film is capable of withstanding more than 400,000 psi. See the aforementioned U.S. Pat. No. 3,566,662 and U.S. Pat. No. 3,665,744 for detailed descriptions of the sleeves and a manner of constructing them. The preferred lubricant comprises a molybdenum disulfide, graphite, a binder, a solvent (e.g. toluol) and possibly some lead oxide. As is known to those skilled in the art, the coefficient of friction of this lubricant can be varied by changing the various components.

In FIGS. 2-5, the cold-working operation of the structure is illustrated. Two abutting workpieces 82 and 84, adapted to be secured together by a fastener, have holes 86 and 88, respectively, drilled therethrough. In FIG. 2, the mandrel 12 is in the fully extended position relative to the gun and its end cap 14 and has been moved through the holes 86 and 88. The sleeve 74 is positioned on the small diameter portion 64 of the mandrel 12 and within the holes 86 and 88. The outer end surface 18 of the nose cap 14 is spaced from the workpiece surface 90 by the retainer 16.

The outer end surface of the retainer 16 is held against the workpiece surface 90 and the flare 76 on the sleeve 74 is engaged in the recess 44 in the end of the retainer. The small diameter surfaces 46 of the fingers 38 are in spring held abutment with the cylindrical surface of the mandrel portion 64 so as to tightly hold the mandrel but be slidably engaged therewith.

Because the cold-working process is a one-sided operation, the split sleeve 74 is installed on the mandrel 12 prior to inserting the mandrel and sleeve into the hole to be expanded and cold-worked. A clearance between the sleeve and the wall of the hole is necessary and is equal to approximately 0.003 inch. As may be visualized from FIGS. 2 and 3, to overcome this clearance, it is necessary for the beginning of the tapered section 66 of the mandrel to travel axially, after contact, approximately 0.065 inch before starting to expand the hole 86.

In FIG. 3, the mandrel has been retracted substantially with respect to the workpiece 82, and the increasing diameter portion 66 and the maximum diameter portion 68 have cold-worked the area around the hole 86 as indicated by the cold-expansion of the sleeve portion in the hole 86. That is, the metal around the hole 86 is in compression and as the increasing diameter portion 66 moves into the hole 88, expansion of the sleeve and hole 88 has commenced.

Figures 4, 5:
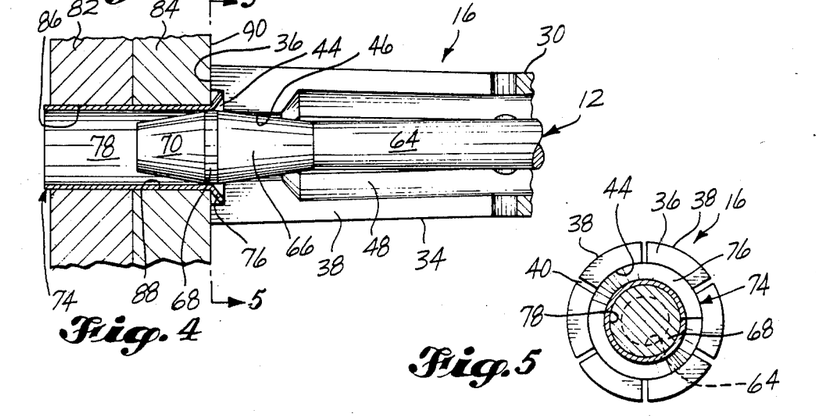
FIG. 4 is a view similar to FIG. 3, illustrating the retraction of the mandrel by the pull gun, the increasing diameter portion and maximum diameter portion of the mandrel having completed the prestressing of the fastener hole.
FIG. 5 is an end view of the sleeve retainer, with sleeve and mandrel shown in section, taken along the line 5—5 in FIG. 4.

In FIG. 4, the cold-working of the hole 88 has been completed when the large diameter portion has been withdrawn from the hole 88.

A considerable pulling force is required to pull the increasing and large diameter portions of the mandrel through the sleeve and cold-expand the holes. As the increasing diameter portion 66 of the mandrel starts to expand the sleeve in the hole 86, a holding force is exerted on the flared end 76 in the recess 44 in the end of the retainer 16. At this time, the ends 36 of the fingers 38 are in very substantial pressure engagement with the surface 90 of the workpiece and the fingers 38 are adapted to remain in contact with the smaller diameter portion 64 of the mandrel, FIG. 2, so that the sleeve does not slip between the mandrel and the fingers. This is made possible by the recess arrangement and the spring force of the fingers on the cylindrical portion of the mandrel. As the mandrel is further retracted through the holes 86 and 88, the force on the sleeve in the recess is increased to retain it therein even though the larger diameter portions of the mandrel radially expand the small diameter portion 44 of the fingers. During the expansion, the fingers remain in tight contact with the mandrel, to aid in retaining the sleeve in the recess, FIGS. 4 and 5.

As indicated, a considerable pulling force is required to pull the mandrel through the sleeve and cold-expand the holes. The maximum diameter cylindrical portion 68 of the mandrel substantially increases the friction and pulling forces around the hole during the cold-working operation. For 3/16 inch to ½ inch diameter holes in various aluminums these forces are in the range of between 2,000 and 9,000 lbs. This same pulling force on the mandrel reacts on the flared end 76 of the sleeve in the recess 44 and as stated, prevents the sleeve from slipping on the mandrel.

Figure 6:
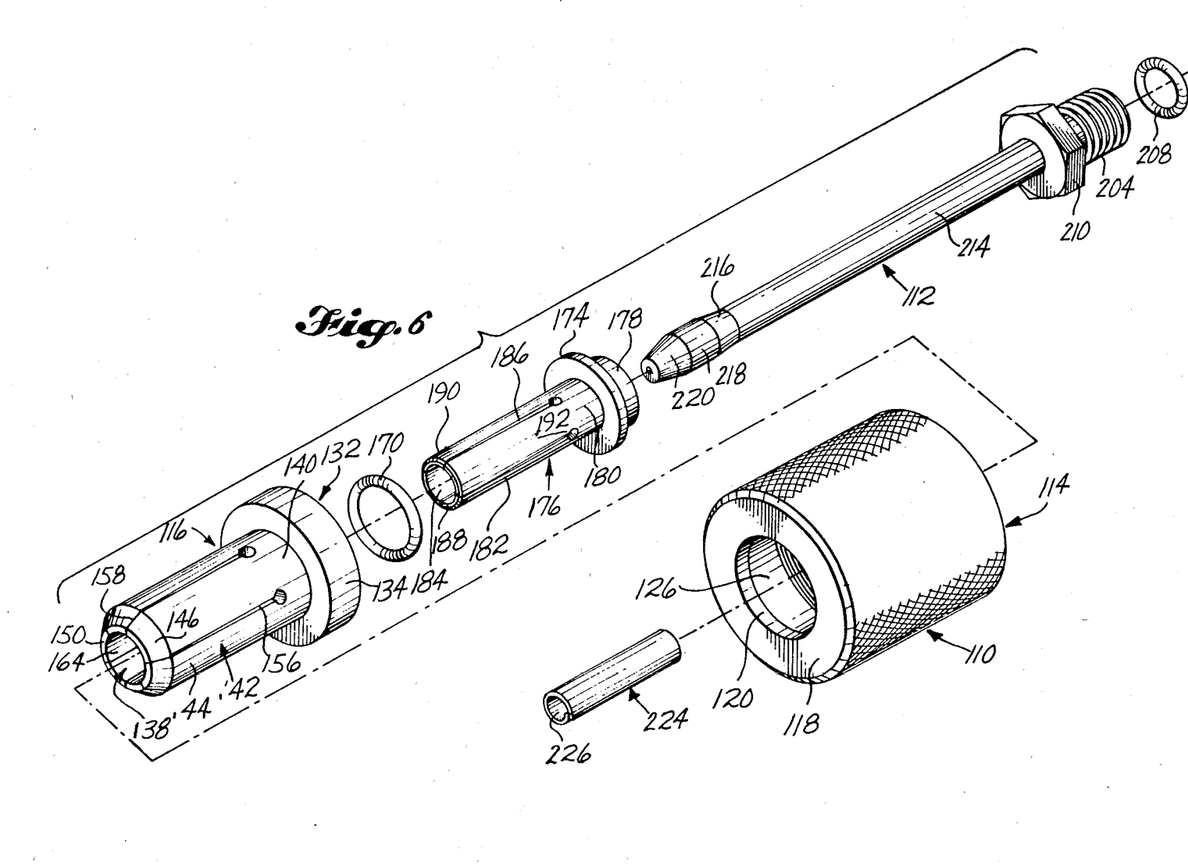
FIG. 6 is an isometric exploded view of the parts of cold-working equipment for countersunk holes, including the outer end cap of a pull gun in which the equipment is carried.
Figure 7:
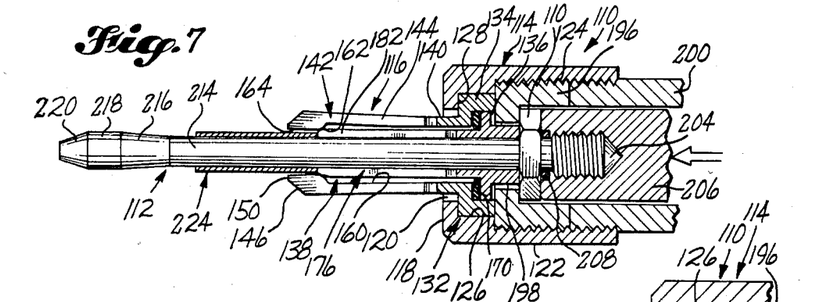
FIG. 7 is a cross sectional view of the outer end of a pull gun having a mandrel, and a countersink cold-working device and sleeve retainer, secured in the gun, the retainer having been moved outwardly of the inner end of the mandrel to open the countersink device to receive a split cold-working sleeve.

Devices for cold-working a countersunk fastener hole are shown in FIGS. 6–12. A pull gun 110, indicated only by its cylindrical nose cap 114, is operated hydraulically, as indicated above, to move a mandrel 112 from an extended, FIGS. 7 and 8, to a retracted position, FIG. 12. The generally cylindrical nose cap 114, FIGS. 6 and 7, is provided adjacent the working and outer end of the pull gun and is adapted to secure a small diameter, elongated generally tubular countersink cold-working member or device 116 within the outer end of the gun. The cap 114 has an outer radial end wall 118 formed to include a cylindrical center opening 120. Axially inwardly of the wall 118 is an external cylindrical wall 122 having internal threads 124, FIG. 7, terminating axially forwardly in a small diameter portion 126 forming an inwardly extension of the opening 120. Inwardly of and radially outwardly of the opening 120 is a flange 128 formed by the wall 118 and which is adapted to retain a radially extending flange base 132 of the countersink cold-working or cold-expanding device 116, FIGS. 6–8. The flange has an axially directed cylindrical wall 134 which at its inner end has a counterbore 136. Extending outwardly of the counterbore and through the device 116 is a generally central tubular passage 138.

The countersink cold-working device 116 is first formed in a cylindrical configuration having a continuous cylindrical wall 140 and having the fingers 142 spaced by axially directed slots having generally parallel sides. The device 116 is made from a ultra high strength alloy steel, or equivalent, and then heat treated. As a part of the heat-treating process, the fingers 142 are clamped together adjacent their ends, inwardly of the conical surfaces 146. This narrows the slots into slits 156 and 158. The surfaces of the slits 156 extend generally along the finger portions 144, and the surfaces 158 of the slits are substantially in contact inwardly of the radial surfaces 150, the contact extending substantially inwardly along the conical surfaces 146. The external surfaces of the fingers 142 are changed so that the portions 144 are tapered outwardly from their inner ends to the conical surfaces 146. Thus, the outer surfaces of the fingers portions 144 in cross section have decreasing diameters in the outwardly direction so that the device is generally conical outwardly of the uninterrupted cylindrical wall portion 140.

The device with the clamping ring adjacent the outer end is heat-treated and quenched in a conventional manner and then the clamping ring is removed. After the removal of the ring, the device 116 retains the shape shown in FIG. 6. The heat-treating process substantially hardens the steel and stiffens the spring fingers 142 so that the conical cold-expanding surfaces 146 are able to exert great force on the countersink during the cold-working operation. The conical angle of the surfaces 146 is complementary to the angle of the countersink of the hole to be cold-expanded.

Figure 8:
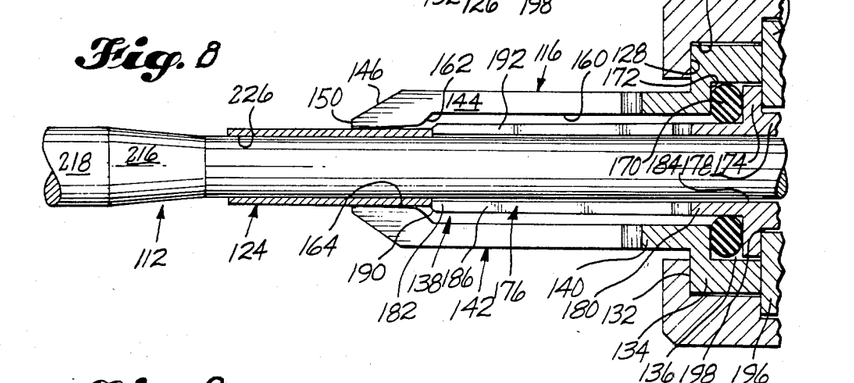
FIG. 8 is a view similar to FIG. 7, illustrating the sleeve retainer in a withdrawn position relative to the countersink device, and in which the sleeve is in retention position on the retainer between the small diameter portion of the countersink device and a small diameter of the mandrel.

The internal configuration of the finished device 116 is best seen in FIGS. 7 and 8. The passageway therethrough is bordered by the internal surfaces of the fingers 142, outwardly of the uninterrupted cylindrical wall 140. Internal surfaces 160 of the finger portions 144 tend to form smaller diameters axially outwardly. Axially outwardly of the surfaces 160 are conical shoulders 162 with the diameters decreasing axially outwardly. The shoulders 162 provide cam follower surfaces. Outwardly of the surfaces 162 are finger surfaces 164 which are only slightly conical, having their diameters decreasing outwardly.

At the inner end of the countersink cold-working device, FIGS. 7 and 8, the counterbore 136 is adapted to receive an annular spring in the form an elastomeric O-ring 170. The outer end of the O-ring abuts a shoulder 172 of the bore. An annular flange 174 of a sleeve retainer, generally designated as 176, FIG. 6, supports the O-ring inwardly within the gun. The sleeve retainer is somewhat similar in configuration to the countersink device and is made of the same type of material, generally a heat-treated ultra high strength alloy steel. Inwardly of the flange 174 is a large diameter continuous cylindrical portion 178 and outwardly of the flange is somewhat smaller diameter generally cylindrical continuous tubular portion 180, terminating in an outer slotted-end tubular portion 182. The sleeve retainer has a generally cylindrical passageway 184 therethrough, adapted to extend over the mandrel 112 and to be slidably engaged within the passageway of the countersink device 116.

The sleeve retainer has four annularly spaced, axially directed slots 186 extending inwardly from its outer end surfaces 188 on which there are arcuate cam surfaces 190 ending so as to be generally parallel, in side view, FIG. 8, to the cam follower surfaces 162 on the countersink device. Spaced between the slots 186 are four stiff axially directed spring fingers 192. As shown in FIG. 6, the retainer 176 is tapered toward the end 188 and the slots 186 are decreased in width so as to be slits at the outer end 188 and in spring biased contact with the mandrel 112.

Figure 9:
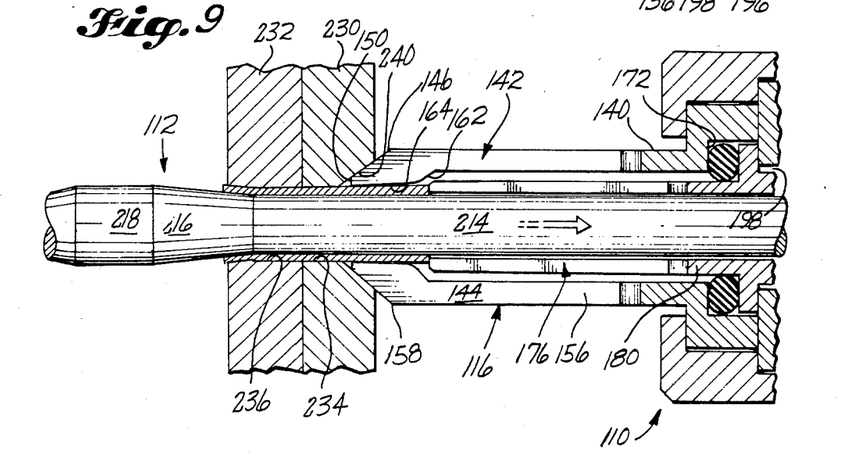
FIG. 9 is a view of the mandrel and sleeve in the workpiece in position to cold-work the fastener hole, and the conical end of the cold-working device being in the countersink in position to cold-work the same, and the retainer being in position to hold the sleeve during the cold-working operation.

As shown in FIGS. 7–9, the flange 132 of the countersink cold-working device 116 has an outer radial surface in contact with an inner radial surface 128 of the nose cap 114 and the inner end of the wall 134 is in abutment with an internal nut 196 threadedly engaged with internal threads 124 of the cap 114. The nut 196 has a radially inwardly directed flange which abuts the inner end of the device 116 to secure it tightly in place within the cap 114.

The inner end 178 of the sleeve retainer is spaced by an annulus 198 from the inner axial surface of the locking nut 196. Inwardly of the nut 196 is a sleeve portion 200 of the gun threadedly engaged in the cap 114.

An inner end 204 of the mandrel is threadedly engaged in an adapter 206, secured to a pneumatic piston of the gun, not shown. The end 204 is hand tightened into the adapter and is locked in place by an O-ring 208. The O-ring 208 is in abutment with the plate 210 fixed to an inner end of a small diameter portion 214 of the mandrel. The outer surface of the abutment plate 210 is in pressure engagement with the end 178 of the sleeve retainer 176 when the mandrel is in its fully extended position so as to compress the O-ring 170 between the flange 174 on the sleeve retainer and the radial surface 172 of the cold-expansion countersink device 116.

The small diameter portion 214 of the mandrel is substantially elongated to extend outwardly through the sleeve retainer 176 and the countersink device 116. Outwardly of the small diameter portion 214 is an increasing diameter portion 216 of the mandrel, which terminates in a maximum diameter portion 218. Extending from the maximum diameter portion 218 of the mandrel is a tapered outer end 220.

A thin axially split, generally cylindrical cold-expansion steel sleeve 224, having a internal cylindrical surface 226, is adapted to be slipped over the outer end of the mandrel onto the small diameter portion 214. The sleeve 74, FIG. 1, is substantially the same as sleeve 224 except for the inner flared end which is not required in the latter sleeve. The interior surface 226 is lubricated as described above with respect to the surface 78. As indicated above, additional information with respect to these sleeves is described in U.S. Pat. Nos. 3,566,662 and 3,665,744.

The inner small diameter slightly conical portions 164 of the fingers 142 of the countersink device are biased inwardly so as tend to be in relatively tight contact with the mandrel portion 214 to prevent the insertion of the sleeve on the mandrel to the end of the retainer in its position of retention for the cold-working operation. As seen in FIG. 7, the mandrel is moved outwardly so that the abutting member 210 makes contact with the inner radial surface of the inner cylindrical portion 178 of the retainer and continues outwardly until the abutting member makes contact with the inwardly directed flange on the retaining nut 196. In this movement the inner flange 174 is moved outwardly to compress the O-ring spring 170. Simultaneously, the cam edges 190 on the outer end of the retainer make contact with the cam followers 162 axially inwardly of the small diameter portions 164 on each of the fingers 142 so as to move the outer ends of the fingers radially outwardly from the cylindrical portion 214 of the mandrel. This permits the sleeve 224 to be moved inwardly into the retention position against the outer ends 188 of the fingers of the retainer. A slight retraction of the mandrel so that its abutting member 210 is moved away from the inner end of the retainer portion 178 permits the O-ring 170 to be expanded so as to move the flange 174 inwardly into its normal position against the locking nut 196, FIG. 8. After the cams 190 are removed from the cam followers 162, the generally conical surfaces 164 move into contact with the sleeve 224.

In FIGS. 9-12 two abutting workpieces 230 and 232, adapted to be secured together by a fastener, have holes 234 and 236, respectively, drilled therethrough. Because the cold-working process is a one-sided operation, the split sleeve 224 is installed on the mandrel, as shown in FIGS. 7 and 8, prior to inserting the mandrel and sleeve into the hole to be expanded and cold-worked.

In FIG. 9 the mandrel had been inserted through the holes and the sleeve 224 had been moved in position in the holes by the movement of the retainer toward the workpiece as the countersink conical surfaces 150 had been moved into countersink 240 of the hole 234.

In FIG. 9, the mandrel has been started in the retraction direction, indicated by the arrow on the cylindrical portion 214, and the increasing diameter portion has starting cold-working the material around the hole 236. As this occurs, the conical surfaces 146 of the countersink cold-working device become tightly engaged in the countersink surface 240 of the hole. At the same time the retainer 176 becomes tightly engaged with the end of the sleeve to hold it in place during the prestressing operation. The internal diameter surfaces 164 at the end of the fingers 142 also tightly engage the sleeve to keep it in contact with the retainer and the mandrel surfaces as they pass therethrough.

It should be realized that when the mandrel and sleeve are inserted into the hole or holes to be cold-worked, a clearance between the sleeve and the wall of the holes is necessary as indicated above with respect to FIGS. 2-4. For cold-working a hole having a countersink, it has been found that the maximum diameter portion, as 218 of the mandrel, should extend axially for about the same length as its diameter.

Figure 10:
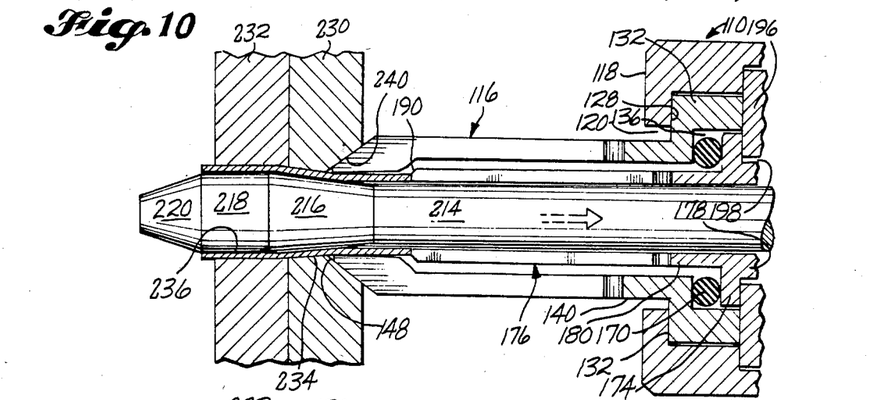
FIG. 10 is a view similar to FIG. 9 in which the mandrel has been substantially retracted into the workpiece so that the increasing diameter portion and large diameter portion of the mandrel are functioning to cold-work the fastener hole.

As shown in FIG. 10, the mandrel has been retracted substantially with respect to the workpiece 232 and the increasing diameter portion 216 and the maximum diameter portion 218 cold-work the area around the hole 236, as indicated by the change in configuration or cold-expansion of the sleeve portion in the hole 236. That is, the metal around the holes 236 is in compression and as the increasing diameter portion 216 moves into the holes 234, expansion of the sleeve and hole 234 has commenced.

Figure 11:
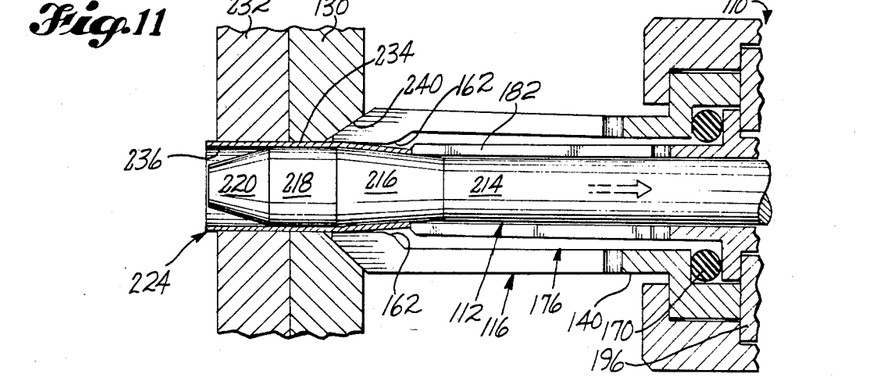
FIG. 11 is a view in which the cold-working has proceeded farther, with the large diameter portion about to move against the sleeve just inwardly of the countersink cold-working portion, and illustrating the sleeve following the shape of the increasing diameter portion as it is held against the outer end of the retainer which is in a state of expansion as a result of the increasing diameter portion of the mandrel entering the same.

In FIG. 11, the cylindrical part of the hole 234 has been substantially cold-worked by the entry of the large diameter portion 218, and the increasing diameter portion 216 is starting to act on the countersink cold-working device within the countersink 240.

Figure 12:
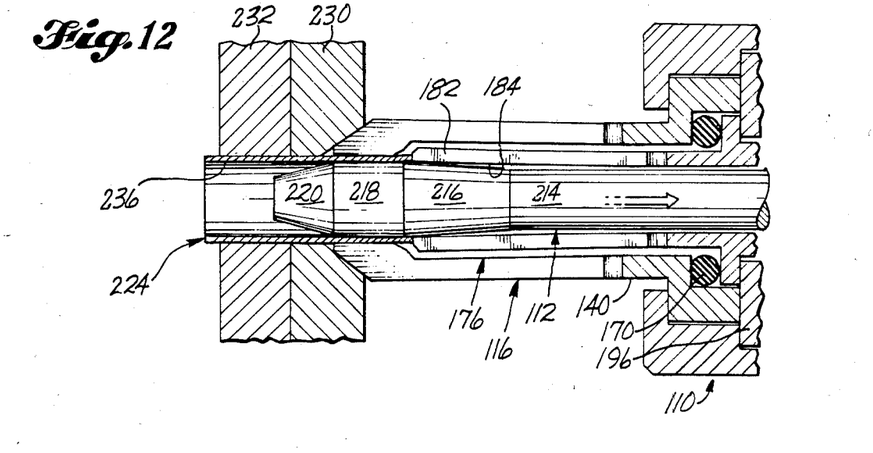
FIG. 12 is a view illustrating the final stage of the cold-working of the hole and of the countersink, the maximum diameter portion of the mandrel passing through the countersink and expanding the retainer radially through a maximum extent while the sleeve is maintained in its retension position.

As shown in FIG. 12, the cold-working of the hole 234 and of the countersink 240 has been substantially completed. As the completion occurs the generally cylindrical surfaces 164 on the ends of the fingers remain in contact with the sleeve and aid in holding the sleeve on the end of the retainer so that the sleeve is held within the workpiece. The extent of countersink prestressing is illustrated in FIG. 2 of copending application Ser. No. 273,725, filed June 15, 1981, now Pat. No. 4,423,619.

A considerable pulling force is required to pull the mandrel through the sleeve and cold-expand the hole and the countersink. The maximum diameter cylindrical portion 218 of the mandrel greatly increases the friction and pulling forces around the hole, as described above. The same pulling forces on the mandrel react against the conical surface 146 of the fingers 142 and this reaction prevents the surface 146 from moving out of the countersink 240 during the cold-working operation. The fingers 142 are of great strength and are held axially in the countersink by the mandrel exerting pressure on the conical surfaces 146 against the countersink 240.

In the action depicted in FIGS. 11 and 12, there is no clearance between the surfaces 146 and the countersink. Therefore, part of the countersink and part of the hole are expanded simultaneously so as to result in a required higher pulling force. This increases the cold-working through a coining effect, the sleeve lubricant allowing the mandrel to expand the countersink.

Another feature that helps maintain the conical forces 146 in the countersink is that the outside of the sleeve is not lubricated. It first locks itself in the wall of the hole when the mandrel starts to expand the hole, and the friction between the outside of the sleeve and the surfaces 164 also provides a force to contain the split finger ends having the conical surface in the countersink.

From the foregoing, it is clear that the relatively small diameter of the countersink cold-working device 116 and the arrangement of the small diameter retainer 176 substantially concentrically engaged therein, outwardly of the gun, provides great advantages in the cold-working of countersunk fastener holes. The small outside diameter of the cold-working device 116 is particularly adapted for use in cold-working through a drill bushing in a drill fixture. Such drill fixtures are typically positioned and temporarily fixed in front of the workpiece in which holes are to be drilled and then cold-worked by cold-expansion. In the drilling operation, the fixtures are used to guide drills through the drill bushings so as to position all of the holes in the correct location.

It should be noted that the outer end of the gun, FIG. 12, is positioned a substantial distance from the workpiece so that the gun would not interfere with protuberances on the workpiece and the small diameter of the device 116 would prevent contact with the protuberances extending from the workpiece. If necessary, the device 116 could be made substantially longer than as shown to avoid protuberances.

Figure 13:
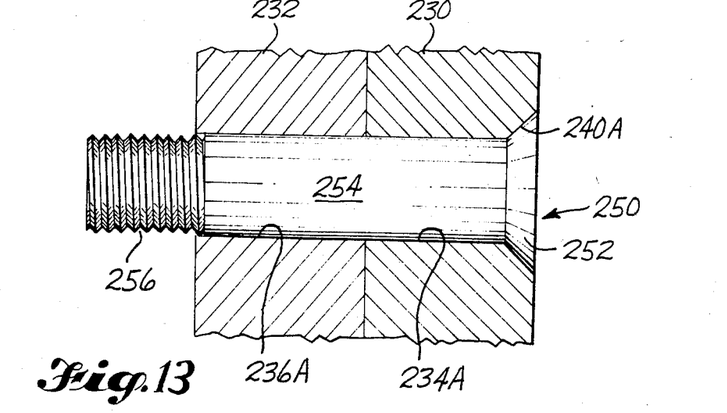
FIG. 13 is a fastener in interference fit in an cold-expanded hole through two workpieces for securing the workpieces together.

In FIG. 13, the workpieces 230 and 232 have had fastener holes, as shown in FIG. 12, cold-expanded to improve the fatigue life of the metal surrounding holes, to be in the form of 234A and 236A and sized in the cold-expanding operation according to the invention. The countersink also has been cold-expanded to be in the form of 240A. In the holes there is a fastener 250 having a head 252, complementary to the cold-expanded countersink 240A, and having a shank 254 of a size for interference fit in the holes. The fastener has a threaded end 256 adapted to receive a nut to hold the workpieces together. The threads are predetermined, as may be other types of ends, such as grooved, corresponding to the fastener, to fit into the cold-expanded holes but having a diameter to be too large to fit into the drilled holes before the cold-working.

When a clearance fit, instead of an interference fit, is desired, predetermined sized rivets or bolts may be used in the cold-expanded and sized holes, according to the invention. That is, clearance fit fasteners may be installed in the holes without post-sizing to remove the ridge made during the cold expansion, for example.

Figure 14:
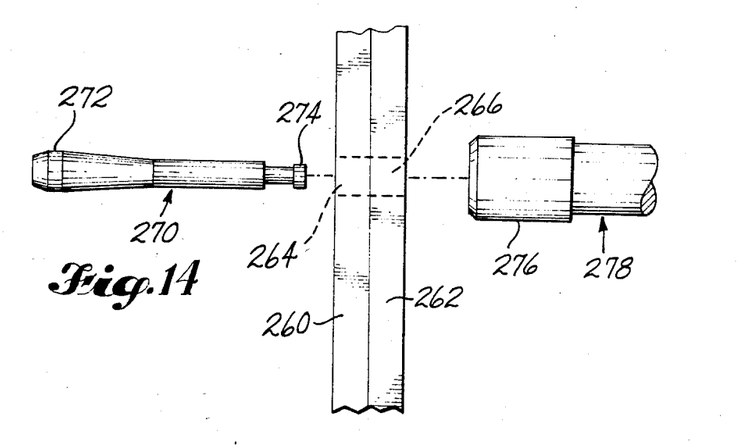
FIG. 14 is a side elevational view of the start of a mandrelizing operation for cold-expanding and sizing a straight hole in two workpieces to be secured together by a fastener.

In FIG. 14 the essentials of the mandrelizing-type of cold expansion are illustrated. Here, workpieces 260, 262 have respective holes 264, 266 to be cold-expanded by a two-sided operation, using a sleeveless mandrel 270 having major diameter 272.

In the operation, the mandrel and holes are lubricated with an improved lubricant. The inner end 274 of the mandrel is moved through the holes by hand and the end 274 is then connected to a nose cap 276 of a pull gun 278. The major diameter 272 of the mandrel is then drawn through the holes 264, 268 which are cold-expanded, according to the invention, as described above.

Figure 15:
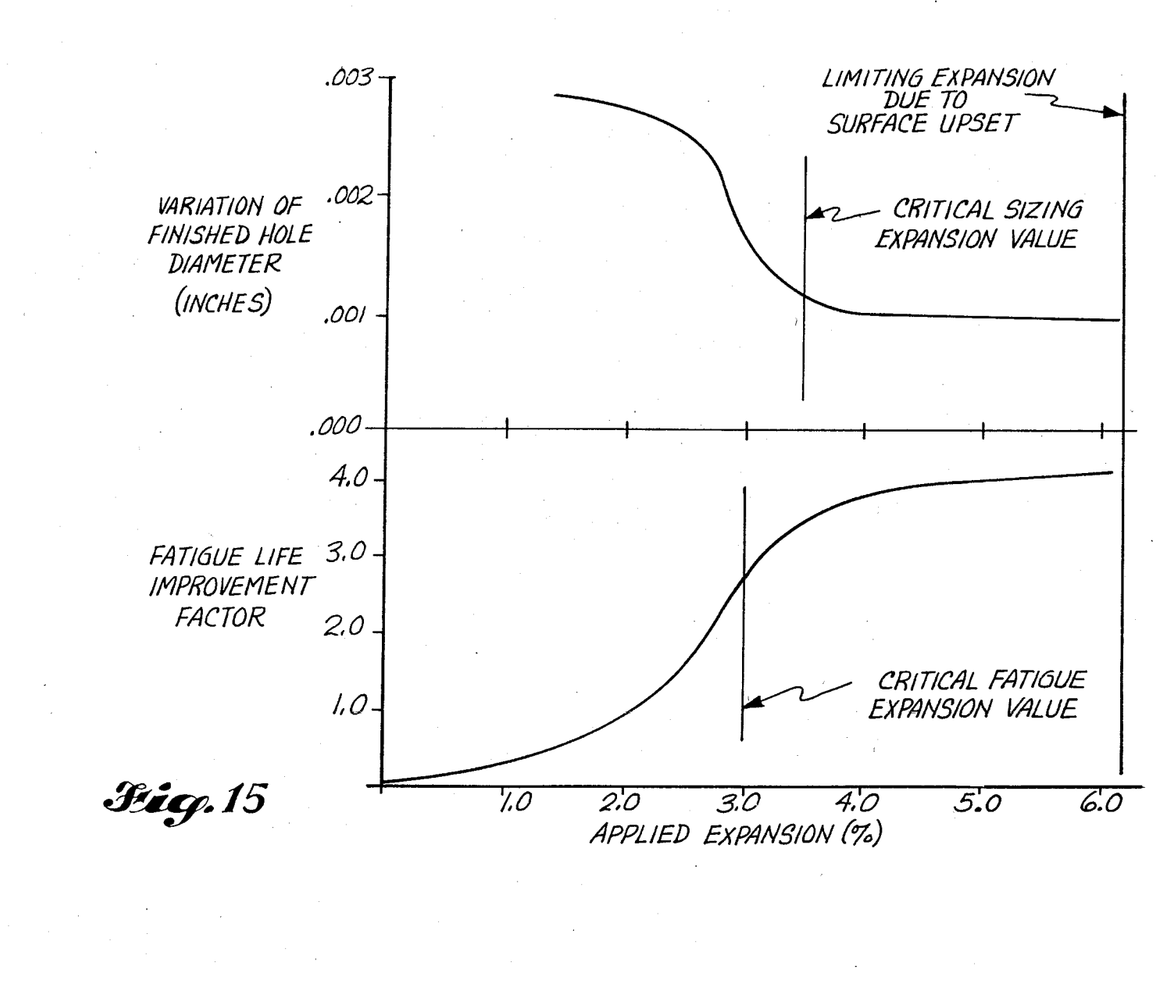
FIG. 15 is a graph in which the variation of finished hole diameters and fatigue life improvement factor are plotted against applied expansion percentages, and illustrating the critical sizing expansion value, the critical fatigue expansion value, and the limit of expansion due to surface upset.

In FIG. 15, the upper part of the graph shows the variation of finished hole diameters in inches and the lower part shows the fatigue life improvement factor, both of which are shown to be plotted against the applied expansion percentage. The upper graph indicates that the percentage of applied expansion for optimal sizing of the cold expanded hole must be greater than 3.5%. The lower graph indicates that the percentage of applied expansion for optimal fatigue improvement must be greater than 3%. The upper limit of applied expansion is that at which the material surrounding the hole starts to become upset. That is, the upper limit of applied expansion is that at which the material surrounding the hole starts to become sufficiently upset to cause an unacceptable separation of structural members such as the two workpieces, 230, 232 or 260, 262.

The minimum percentage of applied expansion for optimal sizing is referred to as the critical sizing expansion value (CSE). The critical sizing expansion value is that value of applied expansion beyond which the retained expansion is linearly exceeded and to nearly but less than the same amount as the total expansion before elongation of the hole axis of the metal surrounding the hole. The CSE is also defined as that value of absolute expansion beyond which the final sizing of the hole is nearly solely determined by the mandrel diameter and the sleeve thickness or the sum of the starting hole diameter plus the absolute applied expansion.

Whereas in the upper part of the graph, the variation in the finished hole diameters is plotted between 0.000" and 0.003", at about 3.5%, the variation of the finished hole diameters is shown to be 0.001" and the graph between 3.5% and 6% does not vary more than 0.001".

The minimum percentage of applied expansion for optimal fatigue life improvement is referred to as the Critical Fatique Expansion value (CFE). The lower part of the graph shows that the optimal fatigue life improvement is achieved at a CFE of 3.0%. The CFE is determined experimentally. It varies with material tensile yield strength, modulus of elasticity and the engineering tradeoffs with respect to tooling tolerances and the upper limit of applied expansion.

A comparison of the upper and lower parts of the graph, show that the hole during cold working expansion has its fatique life improved to the maximum at a slightly lesser percentage of applied expansion than the critical sizing expansion value.

Figure 16:
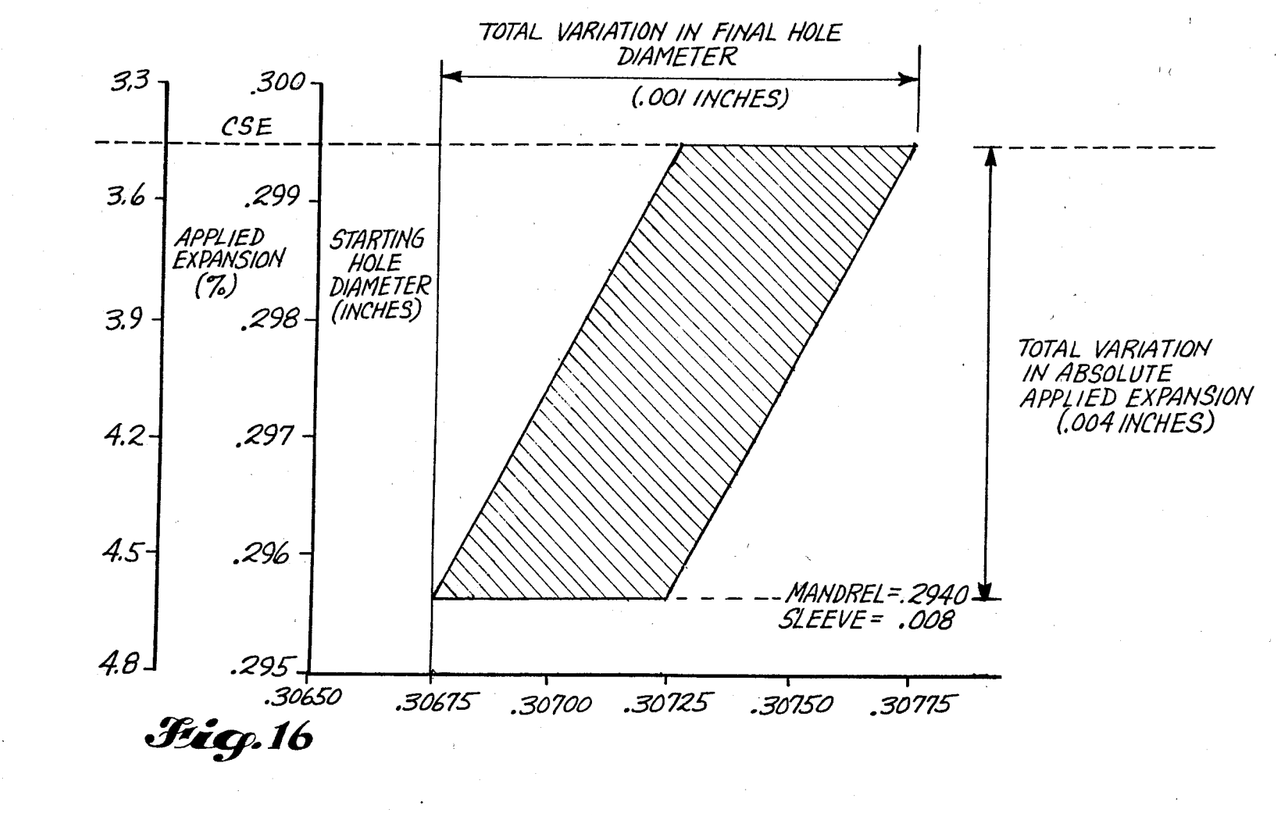
FIG. 16 is a graph in which the applied expansion in percentage and the starting hole diameter are plotted against the finished hole diameters, and illustrating a total variation in the final hole diameters being no greater than 0.001".

FIG. 16 is a graph further illustrating the invention discovery that when a series of starting holes are drilled within a tolerance of 0.004", the series of cold expanded holes will not vary in diameter more than 0.001" when the holes are expanded to at least the CSE.

The CSE in inches for a particular hole diameter of a particular aluminum alloy expressed as a percentage of applied expansion is about 3.5% where the starting hole diameter, as drilled, is about halfway between 0.299 and 0.300". Thus, in situations where a series of holes is drilled, the total variation of the final hole diameters of all the holes will be no greater than 0.001", as shown along the bottom horizontal scale, FIG. 16, the finished hole diameters varying between 0.30675", and 0.30775".

A typical working table of specified diameters for 7075-T6 and 7178-T6 aluminum alloys for one size fastener is shown below. The table shows the mandrel and sleeve size for the starting hole diameter and the fastener to be inserted.

| TYPICAL TABLE OF SPECIFIED DIAMETERS for 7075-T6 AND 7178-T6 ALUMINUM ALLOYS FOR ONE SIZE FASTENER | | | | | | |
|---|---|---|---|---|---|---|
| Cold Expanded Hole Diameter | | Fastener | Resultant Fastener | Starting Hole | Mandrel Major Diameter | Sleeve Thickness |
| Nominal Fraction | Decimal ±.0005 | Diameter ±.0005 | Interference ±.001 | Diameter ±.0015 | +.0002 −.0005 | +.0006 −.0000 |
| 5/16 | .3135 | .3115 | −.002 | .3077 | .3046 | .008 |
| 5/16 | .3115 | .3115 | .000 | .3058 | .3026 | .008 |
| 5/16 | .3095 | .3115 | +.002 | .3039 | .3006 | .008 |
| 5/16 | .3075 | .3115 | +.004 | .3019 | .2986 | .008 |

All Dimensions in inches.

Such tables are prepared for various materials in accordance with the size of the fasteners to be used. The tables are prepared by first determining the retained expansion ratio for the material; that is, the ratio ($E_R$) of retained expansion (R) to the applied expansion ($I_A$) is:

$$E_R = \frac{R}{I_{A\ Absolute\ (Inches)}}, \text{ and}$$

R=FHD−SHD, where FHD is final hole diameter after cold expansion; and SHD is starting hole diameter. Then, the desired finished hole diameter based upon fastener diameter and desired fastener interference is determined. With this information, the mandrel diameter, the sleeve thickness, and the starting hole diameters are computed. Finally, the figures are tested for accuracy by experimental verification.

The formula for absolute applied expansion in inches is $$I_A \text{ Absolute} = D + 2t - SHD,$$

where D is mandrel major diameter, and t is sleeve thickness.

The formula for applied expansion as a percentage is $$I_A (\%) = [(D + 2t \div SHD) - 1.0] \times 100.$$

A further discovery, according to the invention, is that the ridge formed by the split in the sleeve may be left in the hole without adversely affecting the fatique life of a cold-worked hole. It had been believed in the prior art that the ridge had to be removed by reaming. However, according to the invention, the ridges now are plastically removed by the interference fit fastener.

Thus, the invention permits wide manufacturing tolerances where the variation in absolute applied expansion in inches can be as much as 0.004 for a great number of drilled and cold-expanded holes and the variation amongst the final diameters of the holes will be no greater than 0.001", the variations being determined by the starting hole diameter, the mandrel diameter and the sleeve thickness.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A method of fastening a plurality of metal members together, comprising:
   drilling a precision hole of a predetermined diameter through the metals which are to be connected together;
   cold expanding the drilled hole in the members by pulling a mandrel through the hole to both improve the fatigue performance of the metal surrounding the hole and to size the hole the final hole diameter after expansion is equal to the starting hole diameter plus the retained expansion; there being spring back shrinkage of the expanded hole to the retained expansion; said hole being sized by expanding the hole to at least a critical sizing expansion value which is a value of expansion beyond which the retained expansion value is linearly exceeded and to less than the same amount as the total expansion before elongation of the hole axis of the metal surrounding the hole; and
   installing a fastener to fit in the hole.

2. A method according to claim 1, comprising cold expanding the drilled hole in the members by placing as said means a split sleeve of predetermined wall thickness in the hole and pulling a mandrel having a predetermined maximum diameter through the split sleeve.

3. A method according to claim 2, comprising:
   cold expanding a series of holes to size using the same tools and varying the holes in diameter no more than 0.001".

4. A method according to claim 3, in which:
   the gross amount of cold expansion that a series of drilled holes are expanded to size is an applied expansion value which is a function of the drilled hole diameter, the mandrel diameter, and the sleeve thickness.

5. A method according to claim 4, in which:
   the actual amount of applied expansion may vary from the designed applied expansion for each hole by an amount as great as 0.004" for a series of drilled holes.

6. A method according to claim 5, in which:
   the 0.004" variation may be comprised of a 0.003" drilling tolerance, and mandrel diameter and sleeve thickness tolerance of up to 0.001".

7. A method according to claim 1, comprising using a fastener having a head at one end, a threaded portion at the opposite end and a shank between the head and the threaded portion, wherein the threaded portion is sized to fit into the hole after cold expansion but not into the drilled hole prior to cold expansion.

8. A method according to claim 1, wherein drilling of the hole includes drilling a countersink into the outer surface of one of the members which are to be connected together and wherein the cold expansion step includes cold expanding the metal surrounding the countersunk portion of the hole.

9. A method according to claim 1, comprising cold expanding the drilled hole in the members by mandrelizing the drilled hole, said means including a mandrel.

10. A method according to claim 1, in which said means include lubrication and a mandrel; lubricating the drilled hole in the members and lubricating the mandrel; and
    cold expanding the drilled hole in the members by mandrelizing the drilled hole.

11. A method according to claim 10, comprising:
    cold expanding a series of holes to size using the same tools and varying the holes in diameter no more than 0.001".

12. A method according to claim 11, in which:
    the gross amount of cold expansion that a series of drilled holes are expanded to size is an applied expansion value which is a function of the drilled hole diameter, and the mandrel diameter.

13. A method according to claim 12, in which:
    the actual amount of applied expansion may vary from the designed applied expansion for each hole by an amount as great as 0.004" for a series of drilled holes.

14. A method according to claim 12, in which:

the 0.004" variation may be comprised of a 0.003" drilling tolerance, and mandrel diameter and sleeve thickness tolerance of up to 0.001".

15. A method according to claim 1, comprising installing a fastener of predetermined diameter size to make an interference fit in the hole.

16. A method of fastening a plurality of metal members together by use of a fastener having a shank and a head, comprising:
selecting the size of fastener to be used;
calculating a final hole sized to produce a desired fit between the final hole and the shank of the fastener;
selecting a drill size to produce a drilled hole that is smaller than the final hole;
using the selected drill to drill a hole in the members which are to be fastened together;
cold expanding the drilled hole in the members by pulling a mandrel through the hole to both improve the fatigue performance of the metal surrounding the hole and to size the hole the final hole diameter after expansion is equal to the starting hole diameter plus the retained expansion; there being spring back shrinkage of the expanded hole to the retained expansion; said hole being sized by expanding the hole to at least a critical sizing expansion value which is a value of expansion beyond which the retained expansion value is linearly exceeded and to less than the same amount as the total expansion before elongation of the hole axis of the metal surrounding the hole; and
installing the selected fastener in the hole.

17. A method of fastening a plurality of metal members together by use of a fastener having a shank and a head, comprising:
selecting the size of the fastener;
calculating a final hole size to produce a desired fit between the final hole and the shank of the fastener;
selecting a drill size to produce a drilled hole smaller than the final hole which when cold expanded by use of a selected split sleeve and mandrel will become the final hole;
using the selected drill to drill a hole through the members which are to be fastened together;
selecting a split sleeve and a mandrel, sized such that when used to cold expand the drilled hole, will also size the hole to produce the final hole;
inserting the selected split sleeve into the drilled hole;
drawing the selected mandrel through the split sleeve, to expand the split sleeve and in this manner both cold expand and size the drilled hole to produce the final hole the final hole diameter after expansion is equal to the starting hole diameter plus the retained expansion; there being spring back shrinkage of the expanded hole to the retained expansion; said hole being sized by expanding the hole to at least a critical sizing expansion value which is a value of expansion beyond which the retained expansion value is linearly exceeded and to less than the same amount as the total expansion before elongation of the hole axis of the metal surrounding the hole;
removing the split sleeve from the hole following movement of the mandrel through the split sleeve; and
installing the selected fastener into the hole.

18. A method according to claim 17, comprising selecting a fastener which has an end portion, opposite the head, which is sized to fit into the final hole after cold expansion but not into the drilled hole prior to cold expansion.

19. The method of claim 18, wherein drilling of the hole includes drilling a countersink into the outer surface of one of the members which are to be connected together, and wherein the cold expansion step includes cold expanding the metal surrounding the countersunk portion of the hole.

20. A method of cold expanding and sizing a hole in a metal workpiece to achieve the desired fit of a predetermined fastener, comprising:
drilling a starting precision hole having a predetermined diameter;
cold expanding the drilled hole to both improve the fatigue performance of the metal surrounding the hole and to size the hole;
said cold expanding of the drilled hole in the workpiece is by placing a split sleeve in the hole and pulling a mandrel through the split sleeve;
the final hole diameter after expansion being equal to the starting hole diameter plus the retained expansion, therebeing spring back shrinkage of the expanded hole to the final hole diameter;
said hole being sized by expanding the hole to at least a critical sizing expansion value which is a value of expansion beyond which the retained expansion value is linearly exceeded and to less than the same amount as the total expansion before elongation along the hole axis of the metal surrounding the hole.

21. The method according to claim 20, comprising:
cold expanding a series of holes to size using the same tools and varying the holes in diameter no more than 0.001".

22. The method according to claim 20, in which:
a fastener has a threaded portion at one end sized to fit into the hole after cold expansion but not into the drilled hole prior to cold expansion.

23. A method of fastening a plurality of metal members together by use of a fastener having a shank and a head, comprising:
selecting the size of fastener to be used;
calculating a final hole sized to produce a desired fit between the final hole and the shank of the fastener;
selecting a drill size to produce a drilled hole that is smaller than the final hole;
using the selected drill to drill a hole in the members which are to be fastened together;
cold expanding by mandrelizing the drilled hole in the members by pulling a mandrel through the hole to both improve the fatigue performance of the metal surrounding the hole and to size the hole the final hole diameter after expansion is equal to the starting hole diameter plus the retained expansion; there being spring back shrinkage of the expanded hole to the retained expansion; said hole being sized by expanding the hole to at least a critical sizing expansion value which is a value of expansion beyond which the retained expansion value is linearly exceeded and to less than the same amount as the total expansion before elongation of the hole axis of the metal surrounding the hole; and
installing the selected fastener in the hole.

24. A method of fastening a plurality of metal members together by use of a fastener having a shank and a head, comprising:
  selecting the size of the fastener; p1 calculating a final hole size to produce a desired fit between the final hole and the shank of the fastener;
  selecting a drill size to produce a drilled hole smaller than the final hole which when cold expanded by use of a selected split sleeve and mandrel will become the final hole;
  using the selected drill to drill a hole through the members which are to be fastened together;
  selecting a mandrel, sized such that when used to cold expand the drilled hole, will also size the hole to produce the final hole;
  lubricate the drilled hole and mandrel;
  drawing the selected mandrel through the drilled hole, and in this manner both cold expand and size the drilled hole to produce the final hole the final hole diameter after expansion is equal to the starting hole diameter plus the retained expansion; there being spring back shrinkage of the expanded hole to the retained expansion; said hole being sized by expanding the hole to at least a critical sizing expansion value which is a value of expansion beyond which the retained expansion value is linearly exceeded and to less than the same amount as the total expansion before elongation of the hole axis of the metal surrounding the hole; and
  installing the selected fastener into the hole.

25. A method according to claim 24, comprising selecting a fastener which has an end portion opposite the head, which is sized to fit into the final hole after cold expansion but not into the drilled hole prior to cold expansion.

26. A method of cold expanding and sizing a hole in a metal workpiece to achieve the desired fit of a predetermined fastener, comprising:
  drilling a starting precision hole having a predetermined diameter;
  cold expanding the drilled hole by pulling a mandrel through the hole to both improve the fatigue performance of the metal surrounding the hole and to size the hole;
  the final hole diameter after expansion being equal to the starting hole diameter plus the retained expansion, there being spring back shrinkage of the expanded hole to the final hole diameter;
  said hole being sized by expanding the hole to at least a critical sizing expansion value which is a value of expansion beyond which the retained expansion value is linearly exceeded and to less than the same amount as the total expansion before elongation along the hole axis of the metal surrounding the hole.

27. The method according to claim 26, comprising:
  cold expanding a series of holes to size using the same tools and varying the holes in diameter no more than 0.001".

28. The method according to claim 27, in which:
  the gross amount of cold expansion that a series of drilled holes are expanded to size is an applied expansion value which is a function of the drilled hole diameter, and the mandrel diameter.

29. The method according to claim 28, in which:
  the actual amount of applied expansion may vary from the designed applied expansion for each hole by an amount as great as 0.004" for a series of drilled holes.

30. The method according to claim 29, in which:
  the 0.004" variation may be comprised of a 0.003" drilling tolerance, and mandrel diameter tolerance of up to 0.001".

31. The method according to claim 30, in which:
  a fastener has a threaded portion at one end sized to fit into the hole after cold expansion but not into the drilled hole prior to cold expansion.

* * * * *

UNITED STATES PATENT AND TRADEMARK OFFICE
CERTIFICATE OF CORRECTION

PATENT NO. : 4,557,033
DATED : December 10, 1985
INVENTOR(S) : Robert L. Champoux It is certified that error appears in the above-identified patent and that said Letters Patent are hereby corrected as shown below:

Claim 1, line 62; Claim 16, line 21;
Claim 23, line 57; and Claim 24, line 20 insert after "hole" (second occurrence) -- ; --.

Claim 9, last line delete ", said means including a mandrel" and insert -- with said mandrel --.

Claim 10, lines 47 and 48 delete "in which said means include lubrication and a mandrel;" and insert -- including --.

Claim 14, line 68 delete "12" and insert -- 13 --.

Claim 24, line 4 delete "pl".
Claim 17, line 54, after "hole", first occurrence, insert -- ; --.

Signed and Sealed this

Eighth Day of April 1986

[SEAL]

Attest:

DONALD J. QUIGG

Attesting Officer

Commissioner of Patents and Trademarks